United States Patent [19]
Ohtsuki et al.

[11] Patent Number: 5,216,639
[45] Date of Patent: Jun. 1, 1993

[54] METHOD FOR PROCESSING A DOPPLER SIGNAL

[76] Inventors: Shigeo Ohtsuki, 11-7 Chiyoda 4-chome, Sagamihara-shi, Kanagawa, 229; Motonao Tanaka, 4-16 Kunimi 4-chome, Sendai-shi, Miyagi, 981, both of Japan

[21] Appl. No.: 773,573
[22] PCT Filed: Mar. 30, 1990
[86] PCT No.: PCT/JP90/00437
§ 371 Date: Nov. 8, 1991
§ 102(e) Date: Nov. 8, 1991
[87] PCT Pub. No.: WO91/15780
PCT Pub. Date: Oct. 17, 1991

[30] Foreign Application Priority Data
Sep. 30, 1988 [JP] Japan ................... 63-248796

[51] Int. Cl.[5] .............................................. G01S 15/50
[52] U.S. Cl. ..................................................... 367/90
[58] Field of Search ................. 367/90; 342/104, 107, 342/109, 113; 128/662.04, 661.09

[56] References Cited

U.S. PATENT DOCUMENTS

3,798,590 3/1974 Jacobson et al. .
4,556,067 12/1985 Hokanson et al. ................ 73/861.25
4,680,739 7/1987 Lannuzel .............................. 367/90

FOREIGN PATENT DOCUMENTS

0159013 10/1985 European Pat. Off. .
0166392 1/1986 European Pat. Off. .
60-230077 11/1985 Japan .
63-179275 7/1988 Japan .

*Primary Examiner*—Daniel T. Pihulic
*Attorney, Agent, or Firm*—Dickstein, Shapiro & Morin

[57] ABSTRACT

The proposed method permits expansion, compression or reversion of a frequency of a Doppler shift signal. Shift frequency components of a measured Doppler shift signal are multiplied desired times so as to eliminate aliasing or permit precise detection of slow targets. A phase difference obtained at a time in a very short period is substituted with a phase difference obtained in a period longer than the very short period. The frequency conversion is applicable to the continuous wave Doppler system and the pulsed Doppler system.

12 Claims, 11 Drawing Sheets

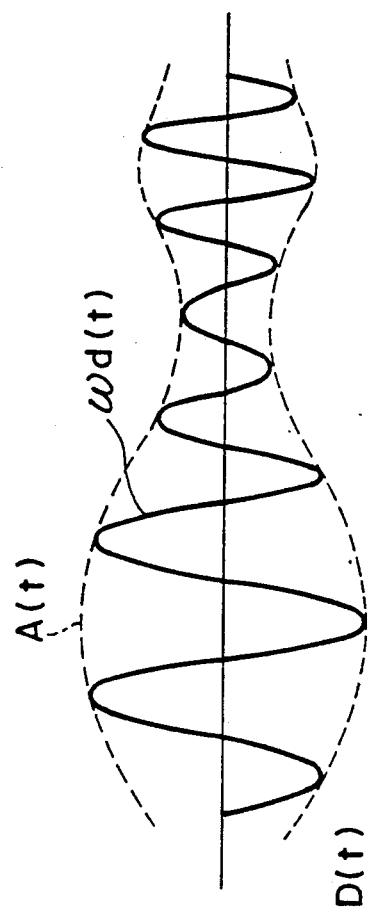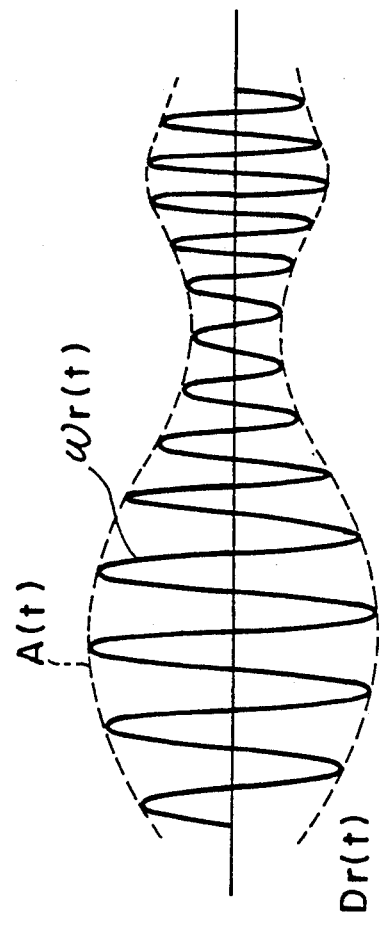

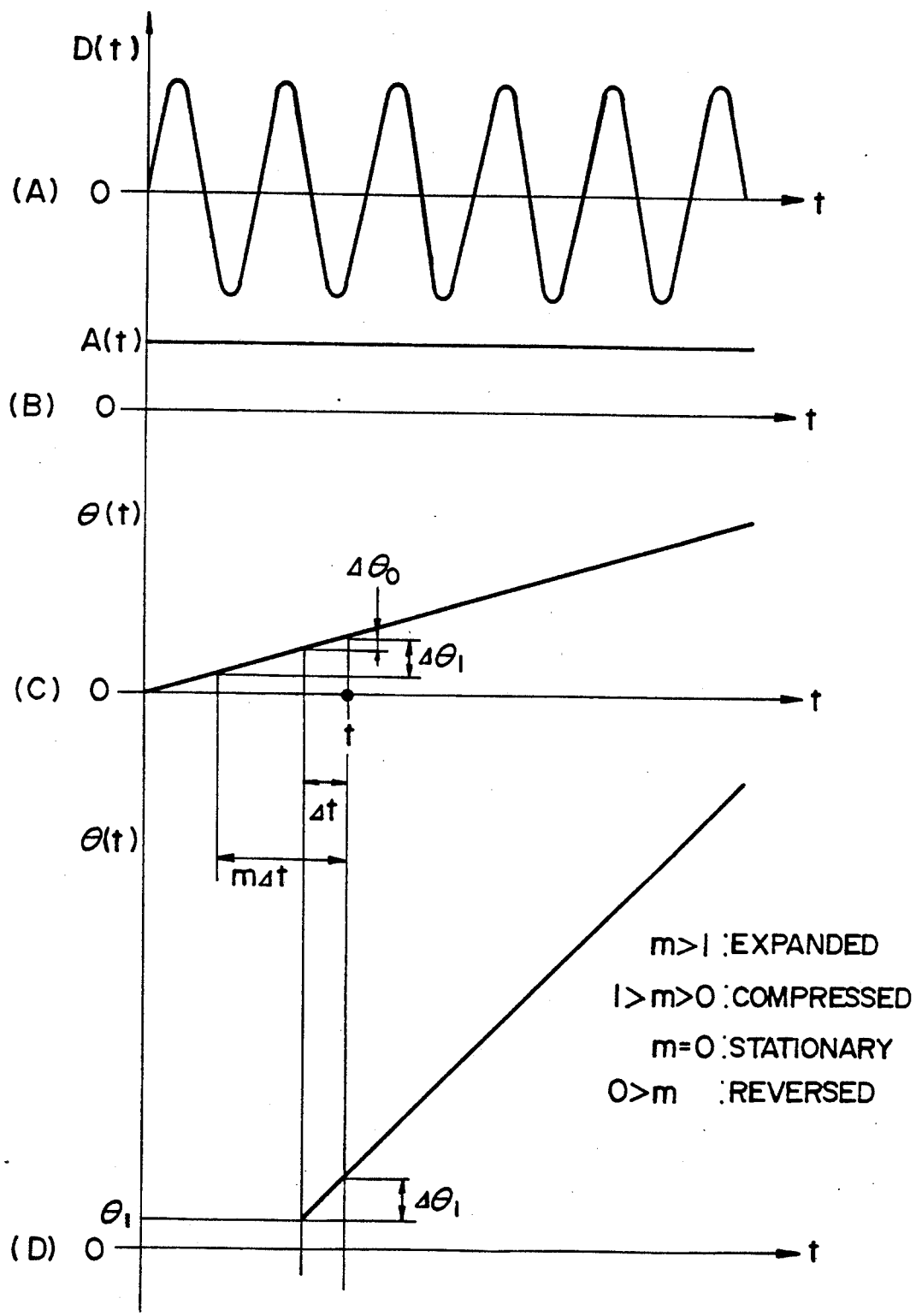

METHOD FOR PROCESSING A DOPPLER SIGNAL

FIELD OF THE INVENTION

This invention relates to a method for processing a Doppler signal, and more particularly to a method for displaying motion of a moving target or analyzing characteristics of the target by fetching a velocity of the moving target as Doppler frequency shift by using ultrasonics or microwaves.

In a sonar, for example, Doppler shift signals are used to detect and locate objects moving in the sea by using ultrasonics. These signals are also used in medical ultrasonic diagnostic equipment to measure the velocity of blood flowing in a patient's circulatory system. In a microwave radar, the Doppler shift signals are used to detect velocities of moving objects such as airplanes or ships.

DESCRIPTION OF THE RELATED ART

Heretofore Doppler shift techniques have been applied to detect motion of an object by using ultrasonics or microwaves without touching the object actually. Specifically, continuous or pulses waves having a predetermined frequency are sent toward the object. In return, an echo is reflected from the object. Since the echo is subject to Doppler frequency shift according to the motion of the object, it is possible to detect precisely the motion or velocity of the object based on the frequency shift of the received echo.

Such Doppler shift techniques have been recently applied to medical measurement using ultrasonics. Specifically, medical ultrasonic Doppler diagnostic equipments are in wide use to measure the velocity of blood flowing through a patient's circulatory system.

At an initial stage of such ultrasonic Doppler measurement, a continuous wave was transmitted to the object, from which an echo was reflected. A beat between the frequency of the echo and that of the transmitted signal was measured to detect Doppler frequency shift.

At recent, a pulsed Doppler system has been developed, in which pulse signals are transmitted intermittently to the object, making it possible to detect a velocity and location of the object simultaneously.

Also at an initial stage of such pulsed Doppler system, signal strength of an echo was too weak to ensure acceptable detection precision. Recent development of a high speed Fourier transformation technique has improved the detection precision to usable levels.

These Doppler techniques are applicable not only to ultrasonic devices but also to microwave radars, being applicable to a variety of fields.

Heretofore, data obtained from Doppler shift signals are mainly Doppler frequency shift resulting from the motion of the object. At recent, attempts have been made to apply the Doppler frequency shift to quantitative measurement through elaborate analysis of frequency components as well as detection of velocities of the objects. Before long, it will become possible to analyze a patient's somatologic organization with medical ultrasonic diagnostic equipment based on the Doppler frequency shift components.

Only a little real-time information is obtained based on the Doppler frequency shift using continuous or pulsed waves. Therefore it is difficult to fetch sufficient data for precise analyses of characteristics.

Further the Doppler shift frequencies are limited to certain ranges. Specifically, the higher the Doppler shift frequency, the more precise velocity detection is possible. Accordingly data sufficient for quantitative measurement can be fetched. However there occurs a phenomenon called "aliasing", wherein the velocity of the object exceeds a maximum velocity for a given ultrasonic transmitted frequency. Therefore, the fetched data would become too erroneous to assure precise measurement.

Aliasing would be indicated as mosaic patterns when the patient's blood flow is displayed in colors two-dimensionally on medical Doppler diagnostic equipment, which would result in poor image display on the diagnostic equipment.

As is well known, aliasing is concerned not only with the velocity of the object but also with the repetition frequency peculiar to the pulsed Doppler system in which pulses are transmitted intermittently. Aliasing can be minimized by increasing the repetition frequency of the pulse as possible.

It is however inevitable that the increase of the repetition frequency would represent limitation on a time interval between the pulse transmission and returning of an echo from the object, i.e. depth of measurement. The higher the repetition frequency, the shorter the measurement depth.

Therefore aliasing has been considered to be essentially inevitable in the pulsed Doppler system. And the Doppler shift frequencies usable for this system have been limited accordingly.

The limitations attributable to the Doppler shift frequencies are also problematic when detecting an object moving very slowly. Although no aliasing occurs in such a case, low frequency components are removed by a filter necessary for processing the fetched Doppler shift frequency, making it impossible to perform quantitative measurements.

These prior art problems are essentially resultant from the limitations on the pulse shift frequencies. It is therefore an object of this invention to overcome those problems by expanding, compressing or reversing the frequency of the Doppler shift signal after it is obtained on real-time basis for measurement.

Variable frequency Doppler systems are known in the field. A typical one of such systems is disclosed in U.S. Pat. No. 4,534,357.

With the prior art system, a wideband signal is transmitted to a moving target, which returns an echo also having a wideband frequency.

Doppler shift signals having a plurality of different frequencies are separated from the wideband signal. Mean frequencies of the respective signals are detected to determine a differential signal.

With this prior art system, only actually measured Doppler shift signals are used as data. It is however impossible to freely change the Doppler shift frequencies, which is proposed as a subject matter of this invention.

Further, a high speed blood flow measuring system using ultrasonic Doppler shift was proposed in 1987, in Report No. US 87-51 in Electronic Data Communication Society, Technical Report US87-50-53 (Dec. 14, 1987), being presented by Messrs. Hisashi Nishiyama, Toshio Ogawa and Kageyoshi Katakura of Hitachi, Ltd.'s Central Laboratory.

The proposed system is characterized in that ultrasonic pulses are transmitted at irregular intervals so as to determine a phase difference.

According to this system, aliasing can be prevented under particular conditions, but only the actually measured values are applied for practical use. Therefore prevention of aliasing is not so remarkable.

SUMMARY OF THE INVENTION

It is therefore an object of this invention to provide a novel system for overcoming the problems encountered with the prior art systems. The proposed system features that the frequency of the Doppler shift signal is changed freely after it is received in return for continuous or pulsed waves sent to an object and is processed.

Specifically, this invention aims at expanding, compressing or reversing the frequency of the fetched Doppler shift signal freely by multiplying desired number of times.

According to this invention, the fetched Doppler shift frequency is multiplied predetermined times so as to be expanded, compressed or reversed.

For this purpose, the frequency of the Doppler shift signal which is detected from transmitted waves and echoes by a conventional typical method is firstly stored in a memory. Data read from the memory are then processed to estimate phase differences at respective spots. The estimated phase differences are optionally multiplied to be outputted as if they are a Doppler shift frequency which is actually measured.

Therefore, the frequency of the Doppler shift signal can be expanded, compressed or reversed as desired by setting the multiplication factor to a suitable value.

According to a first aspect of this invention, a method for processing a Doppler signal comprises storing a Doppler shift signal; substituting the phase of said Doppler shift signal at each time t with a phase variation at time $m\Delta t$ after the current time t, as a phase change during a very short time $\Delta t$ at the current time t; and selecting an optional value for said m; whereby expanding, compressing or reversing of the frequency of the Doppler shift signal is performed.

According to a second aspect of the invention, a method for processing a pulsed Doppler signal comprising storing a discrete Doppler shift signal obtained by a pulsed Doppler system; producing a new Doppler signal train by multiplying m-times the phase component of the Doppler shift signal; and setting m to a predetermined value; whereby expanding, compressing or reversing of the frequency of the pulsed Doppler signal is performed.

According to a third aspect, a method for processing a pulsed Doppler signal comprises multiplying q-times the phase component of the Doppler shift signals; allocating the multiplied phase component as an estimated phase shift component at an actually measured period; and setting q to a predetermined value; whereby expanding, compressing or reversing the frequency of said pulsed Doppler signal is performed.

According to a fourth aspect, a method for processing a pulsed Doppler signal comprises changing the repetition period of a pulse sending signal; estimating a phase in a period succeeding and corresponding to an actually measured period based on a phase difference of actually measured pulsed Doppler shift signals; determining a difference between the estimated phase and a phase actually measured in a period different from the period for the estimated phase; fetching a difference of the intermittently obtained phases having a short period as a difference of the phases having a long equal period; and compressing the frequency of the Doppler shift signal without aliasing.

The actually measured data with aliasing are useless in the prior art systems. According to this invention, however, such data can be used to obtain signals without aliasing or signals with or without a changed Doppler shift frequency.

According to this invention, the repetition period of pulses is changed at a predetermined interval. A phase difference of actually measured Doppler shift signals is determined. Then a phase of the Doppler shift signal in a period succeeding the measured period is estimated. A difference is determined between the estimated phase and an actually measured phase in a period different from the period for the estimated phase.

Therefore the difference between the actually measured phase and the estimated phase is determined in a short period during which no aliasing occurs. Even if the measured or estimated phase suffers from aliasing, a signal without aliasing can be obtained as the phase difference during the short period as described above.

Therefore when the signal without aliasing is fetched as a Doppler shift signal having an equal period, a new train of non-aliased signal can be produced.

BRIEF DESCRIPTION OF THE DRAWINGS

FIGS. 2A and 2B show one example of a Doppler shift frequency measured by the circuit of FIG. 1 and a frequency expanded according to the embodiment, respectively;

FIG. 3 shows details of the frequency conversion shown in FIG. 2;

DETAILED DESCRIPTION

The principles of this invention will be described with reference to the accompanying drawings.

Continuous Wave Pulsed Doppler System

Figure 1:
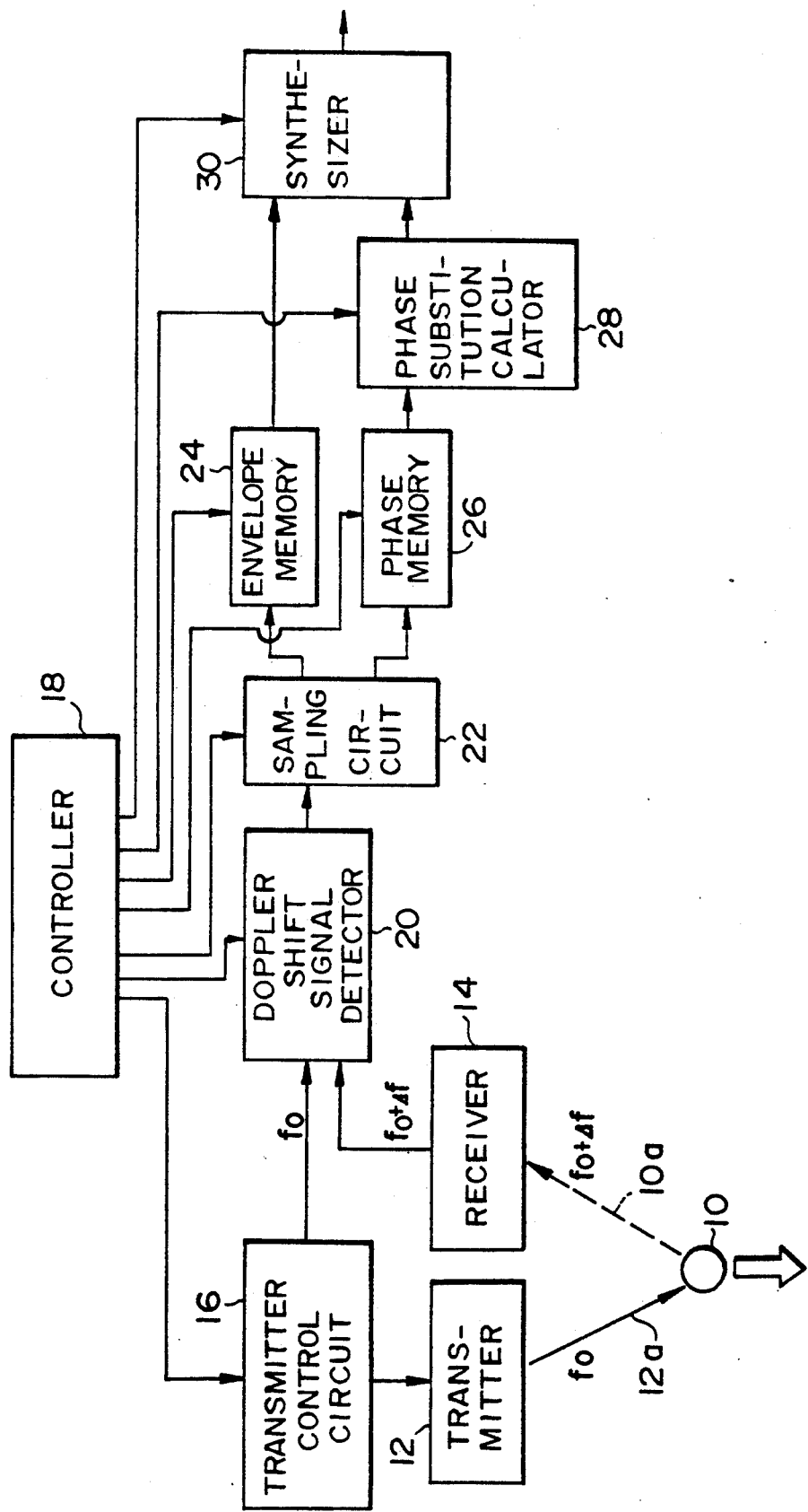
FIG. 1 is a block diagram of a circuit to which an embodiment of this invention is applied as a continuous wave Doppler system.

FIG. 1 shows a Doppler device using a continuous wave.

A transmitter 12 transmits continuous ultrasonic or microwave beams to a target 10 moving as indicated by an arrow in FIG. 1. An echo 10a is reflected from the target 10, being received by a receiver 14.

The beams 12a from the transmitter 12 have a frequency $f_0$ while the echo 10 has a Doppler shifted frequency $f_0 + \Delta f$.

The transmitter 12 is controlled by a transmitter control circuit 16, which is controlled by a controller 16.

The received signal is converted into an electrical signal by the receiver 14, being passed to a Doppler shift signal detector 20. The Doppler shift signal detector 20 calculates the received signal and the frequency $f_0$ from the transmitter control circuit 16, fetching a Doppler frequency component $\Delta f$.

An output from the Doppler shift signal detector 20 is sampled by a sampling circuit 22 with a predetermined sampling frequency, being outputted as a digital signal.

The sampling circuit 22 outputs an envelope and a phase of the Doppler signal separately, which are stored by an envelope memory 24 and a phase memory 26, respectively.

It is the feature of this invention that the phase data stored in the phase memory 26 are subject to a frequency conversion calculation by a phase substitution arithmetic circuit 28. After this, the frequency of the Doppler shift signal is expanded, compressed or reversed as described later.

The phase signal after frequency conversion and the output from the envelope memory 24 are synthesized by a synthesizer 30, and are outputted as a new Doppler shift signal having a converted frequency.

FIGS. 2 show an example of frequency conversion for the Doppler shift signal from the sampling circuit 22 of FIG. 1. FIG. 2A shows a waveform of a Doppler shift signal in original form, and FIG. 2B shows a waveform of the Doppler shift signal whose frequency is expanded.

The Doppler shift signal includes a sine component and a cosine component. Since only one of these components is shown FIGS. 2, these drawings do not necessarily show the components correctly, but show the manner in which the phase or frequency is converted at a constant envelope according to the invention.

In FIG. 2A, the envelope has a phase angle $\theta(t)$ at $A(t)$. The Doppler phase signal $D(t)$ whose phase angle and envelope vary with time is considered now.

The Doppler shift signal is expressed as:

$$D(t) = A(t) \exp(j\Theta(t)) \tag{1}$$

Therefore, the Doppler shift frequency $\omega d(t)$ is expressed as:

$$\omega d(t) = d\, rag(D)/dt = d\Theta/dt \tag{2}$$

FIG. 2B shows a new Doppler shift signal $Dr(t)$ whose frequency (phase) has been expanded according to this invention while the envelope $A(t)$ of the original signal $D(t)$ remains unchanged.

As can be seen in FIG. 2B, the envelope $A(t)$ of the original signal remains unchanged, but the Doppler shift frequency in the signal is expanded as $\omega r(t)$.

According to the frequency expansion as shown in FIGS. 2, the frequency of the Doppler shift signal obtained for a slow object can be expanded without adversely affecting the data originally contained in the signal.

Such frequency expansion facilitates distinction between slow targets and stationary targets.

When the actually measured signal of FIG. 2A is filtered by a non-illustrated conventional filter, low frequency components of the signal will be eliminated, so that resulting data would be insufficient for a slow object. When the Doppler shift frequency is however expanded as shown in FIG. 2B, the data obtained from the slow object are kept sufficient enough even after the signal is filtered as usual.

The phase (frequency) of the measured signal is converted from the condition of FIG. 2A to that of FIG. 2B. FIGS. 3 show the manner in which phase expansion is performed.

FIG. 3 at (A) shows that a Doppler shift signal $D(t)$ which was measured similarly to the Doppler shift signal of FIG. 2A. It is clear that the Doppler shift frequency is constant and that the target 10 is moving at a constant velocity. The envelope also remain steady.

As shown in FIG. 3B, the Doppler shift signal $D(t)$ has the envelope $A(t)$, which remains the same regardless of time.

FIG. 3C shows that the Doppler shift signal $D(t)$ has a phase component $\theta(t)$. Since the object 10 keeps on moving steadily, the phase $\theta(t)$ always varies linearly with time.

In FIG. 3C, aliasing of the phase $\theta(t)$, i.e. aliasing of the phase $\theta(t)$ at $2\mu n$ maximum, is ignored.

According to the invention, the frequency (phase) is converted based on the data on the phase $\theta(t)$. The frequency is multiplied m-times as shown in FIG. 3D.

Frequency conversion at an optional time t will be described hereinafter.

Frequency expansion at the time t is performed as follows. The phase difference $\Delta\theta_0$ of the Doppler shift signal in a very short period $\Delta t$ preceding the time t is substituted with a phase variation $\Delta\theta_1$ in a period $m\Delta t$ which is determined by multiplying m-times the very short period $\Delta t$.

For this substitution, the phase substitution calculator 28 of FIG. 1 estimates the period $m\Delta t$ beforehand, comparing the phase $\theta(t)$ at the time t with a phase $\theta(t-m\Delta t)$ of a Doppler shift signal which is issued before or after the time t by $m\Delta t$, and determining the phase variation $\Delta\theta_1$.

When the phase variation $\Delta\theta_1$ is assumed to be the phase variation in the very short period $\Delta t$, characteristics as shown in FIG. 3D are determined. The phase $\theta_1$ serving as the reference value for the phase difference $\Delta\theta_1$ is determined optionally.

The Doppler shift frequency can be changed optionally by varying the time t in succession and by adding the shift difference $\Delta\theta$ to the reference phase $\theta t$. Therefore the Doppler shift frequency can be expanded as shown in FIG. 3.

Assuming the converted Doppler shift frequency to be $\omega r(t)$, the following will be obtained.

$$\begin{aligned}\omega r(t) &= \lim (\Delta\theta/\Delta t) \\ &= \lim ((\theta(t) - \theta(t - m\Delta t))/\Delta t) \\ &= m \lim ((\theta(t) - \theta(t - m\Delta t))/m\Delta t) \\ &= m d\theta/dt \\ &= m\omega d(t)\end{aligned} \tag{3}$$

The Doppler shift signal $Dr(t)$ thus obtained will be as shown in FIG. 2B. It can be seen that the Doppler shift frequency $\omega r$ of the signal is m-times the Doppler shift frequency $\omega r$ of the original signal D.

The signal $Dr(t)$ will be:
$$Dr(t) = A(t)\exp(j(m\theta(t) + \phi)) \tag{4}$$

where $\phi$ is a constant.

In the Doppler device using the continuous waves, it is understood that the measured Doppler shift signal can be multiplied m-times according to this invention. Since m is a real number, the following facts can be established.

When m>1, the Doppler shift frequency will be expanded.

When 0<m<1, the Doppler shift frequency will be compressed.

When m=0, the object is stationary.

When 0>m, the motion is reversed by a predetermined expansion or compression factor.

Figure 4:
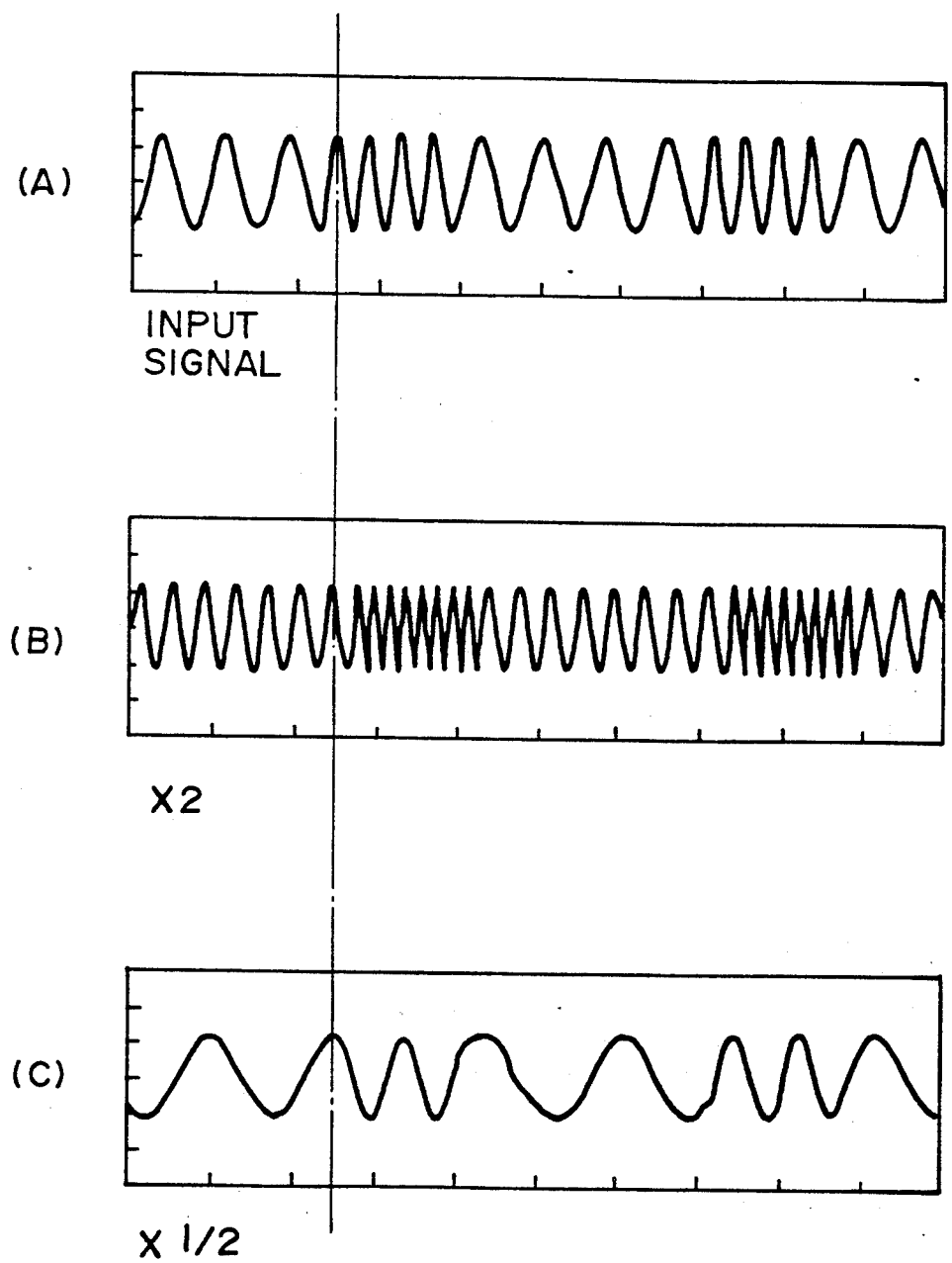
FIGS. 4 show an example each of an expanded, compressed and reversed waveform of a continuous wave frequency obtained by using false pulses in the circuit of FIG. 1.

FIGS. 4A to 4C show expanded and compressed waveforms of the Doppler shift frequency using the continuous waves.

FIG. 4A shows a Doppler shift input signal in which 157 Hz and 315 Hz signals are switched in every four periods.

FIG. 4B shows that the frequency of the Doppler shift input signal of FIG. 4A is expanded two times. It can be seen that the frequency is changed in every eight periods, and that the time interval for changing the frequency remains unchanged.

According to the invention, the frequency of the Doppler shift signal is changed at the predetermined ratio with time lapse. However it is clear that the envelope remains constant.

FIG. 4C shows that the Doppler shift input signal is compressed to half and that the frequency is changed in every two periods.

It will be understood that the time interval for changing the frequency remains unchanged even when the frequency is compressed.

Figure 5:
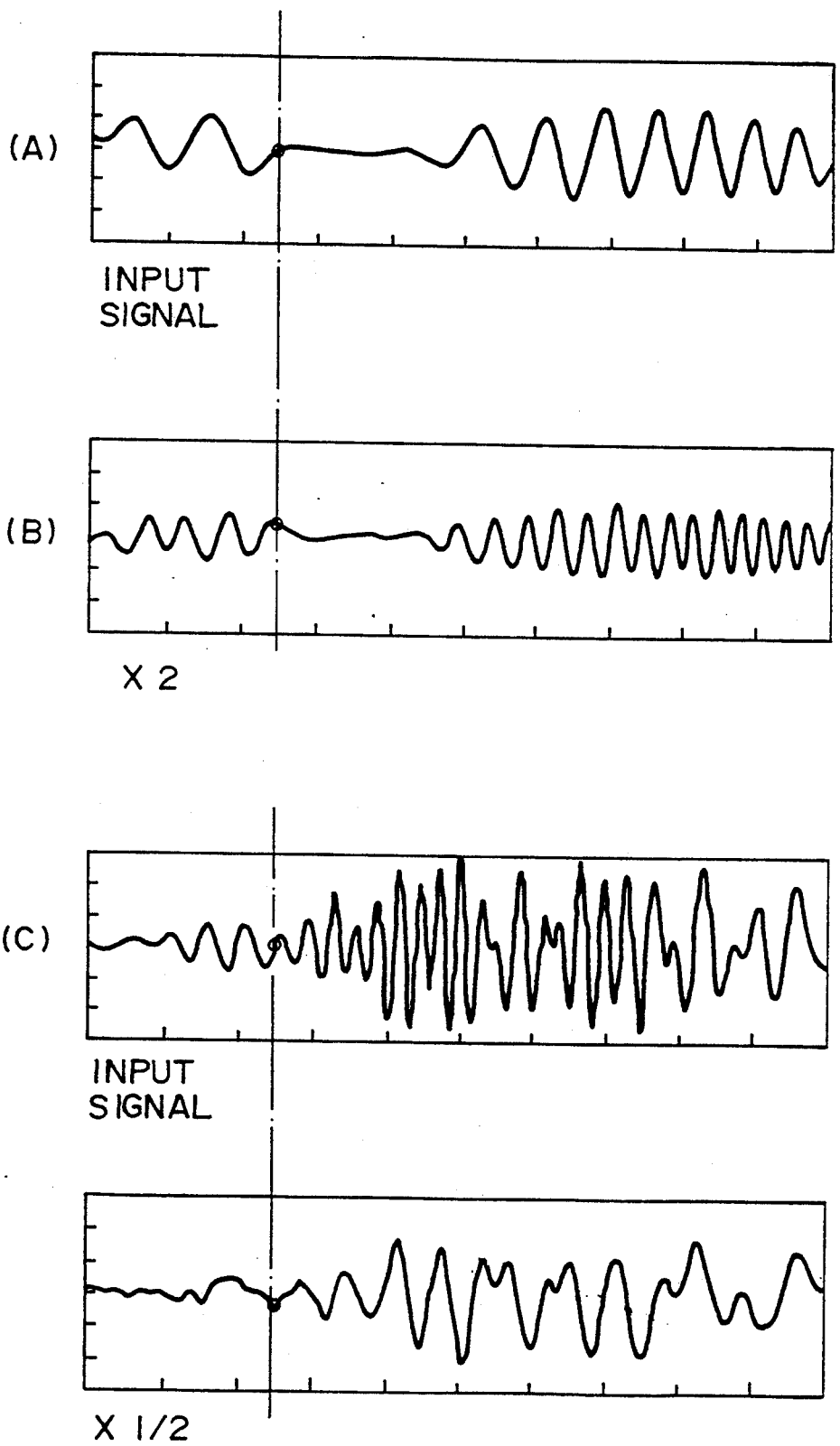
FIGS. 5 show waveforms representing motions of walls and valves of a patient's heart, in expanded and compressed form, respectively.

FIGS. 5 show the manner in which the Doppler shift signal is processed.

FIG. 5A shows a Doppler shift signal obtained by measuring a patient's heart wall which is beating slowly, while FIG. 5B shows that the frequency of the measured Doppler shift signal is expanded two times.

In FIG. 5C, a quick motion of a patient's heart valve is shown as an input signal. The frequency of the input signal is compressed to half as shown in FIG. 5D.

Regardless of the Doppler shift frequency measured actually, a signal having a desired Doppler shift frequency can be obtained by calculation according to this invention. The data contained in the Doppler shift signal can be used very effectively.

Application to a Pulsed Doppler System

This invention is applicable to a pulsed Doppler system as well as to the foregoing continuous wave Doppler system.

The pulsed Doppler system corresponds to the foregoing continuous wave Doppler system in that Doppler shift signals are discretely sampled. The time difference $\Delta t$ in the continuous wave Doppler system is replaced by a pulse repetition period $\tau$.

When a signal is measured actually at a time which is $m\tau$ before or after the time to be substituted, i.e. when m is a natural number, the result as described above will be obtained by substituting the phase as the time.

When a newly measured value is not available for substitution, a Doppler shift signal at a desired time is estimated based on the already measured value. The multiplication factor m can be determined as desired. Therefore, the invention is applicable to the pulsed Doppler system.

Figure 6:
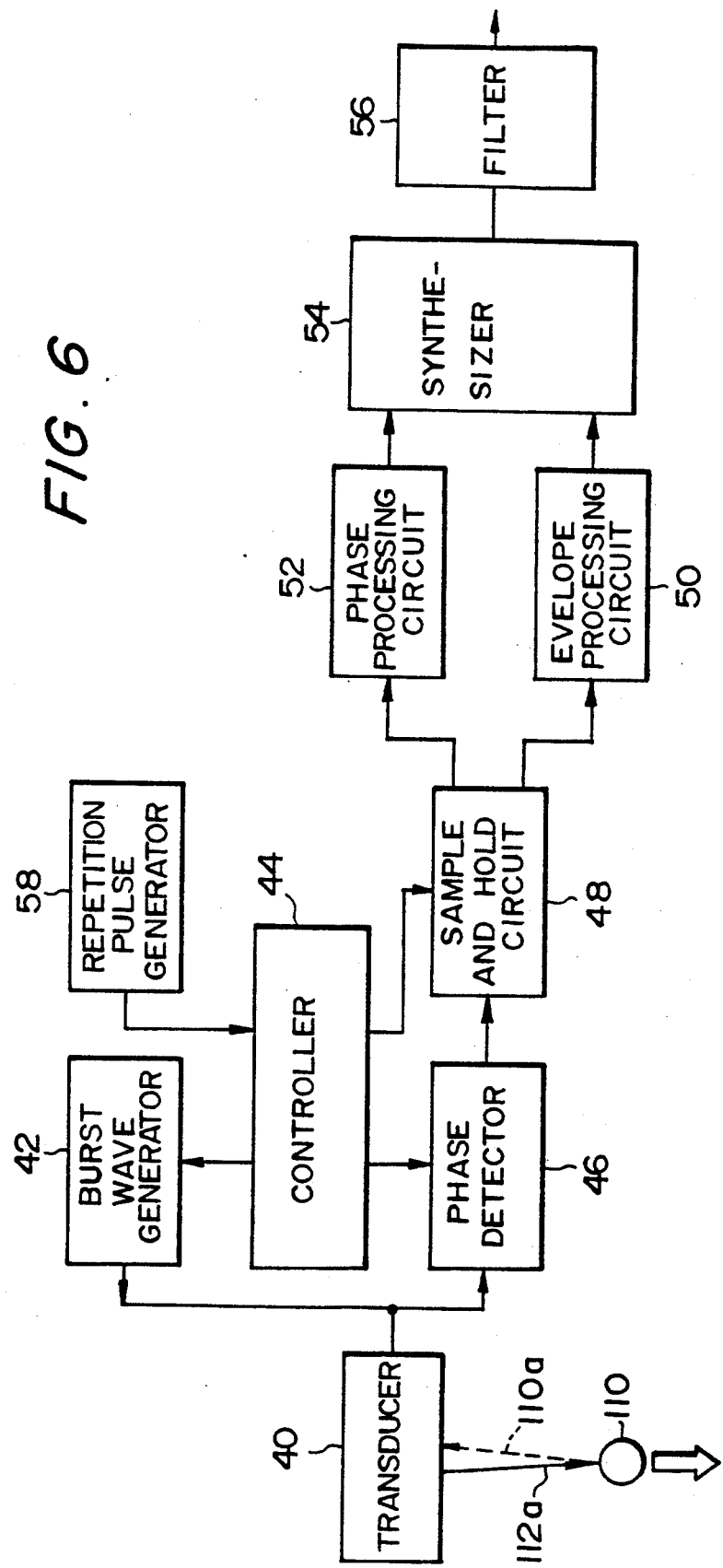
FIG. 6 is a block diagram of a circuit to which the invention is applied to a pulsed Doppler system.

FIG. 6 is a block diagram of a circuit suitable for the pulsed Doppler system to which the invention is applied.

As shown in FIG. 6, a transducer 40 sends pulsed beams 112a to a target 110, which returns an echo 110a. The transducer 40 detects the echo 110a.

A burst generator 42 serves to generate an excited signal having a repetition period determined by a controller 44, supplying the signal to the transducer 40. Receiving the excited signal, the transducer 40 transmits it as the pulsed beams 112a.

As is well known, since signal transmission and reception are carried out at different timings in the pulsed Doppler system, the same transducer 40 is usable for both transmission and reception.

When the transducer 40 receives the echo 110a, a phase detector 46 outputs a Doppler shift signal similarly to the Doppler shift signal detector 20 of FIG. 1.

In this embodiment, a sample-and-hold circuit 48 samples only necessary measured range data from the Doppler shift signal so as to obtain range resolution.

The Doppler shift signal sampled by the sample and hold circuit 48 and having predetermined measurement depth is supplied to an envelop processing circuit 50 and a phase processing circuit 52, respectively, as described in the foregoing continuous wave Doppler system. The envelope and phase of the Doppler shift signal are processed by the circuits 50 and 52, respectively.

It is a feature of this invention that the frequency of the Doppler shift signal is converted in the phase processing circuit 52.

As described later, the Doppler shift signal having a processed phase (frequency) is synthesized with an envelope signal in the synthesizer 54. A DC component of the synthesized signal is eliminated by a filter 56, being transmitted to a frequency analyzer or other units in a succeeding stage so as to be used as data for quantitative analyses or for image display.

In the pulsed Doppler system in this embodiment, a new Doppler shift signal having a desired frequency can be estimated based on the Doppler shift frequency actually measured. The new Doppler shift signal thus obtained corresponds to the original Doppler shift signal whose frequency has been expanded, compressed or reversed.

When the frequency of the Doppler shift signal is compressed or expanded similarly to the continuous wave Doppler system, velocities of moving targets can be quantitatively measured without being affected by aliasing.

Expansion of the frequency of the Doppler shift signal enables velocity measurement of very slow targets, which has been very difficult up to now.

In the circuit of FIG. 6, the controller 44 receives from a repetition pulse generator 58 a signal for determining the repetition frequency of the pulses to be transmitted. The repetition frequency of the pulses can be changed at each transmission period or at desired plurality of transmission periods.

Figure 7:
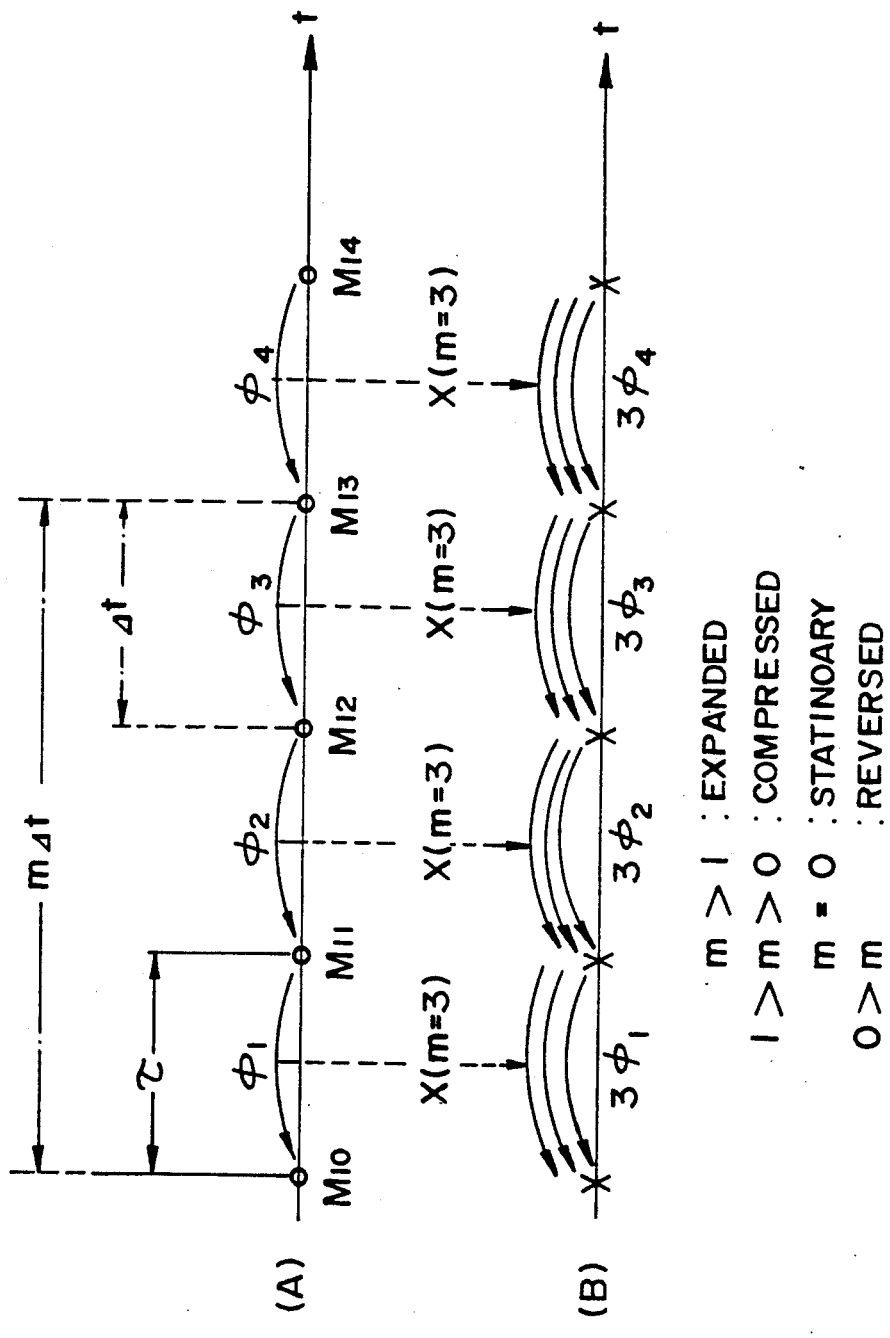
FIGS. 7, 8, and 9 show frequency conversions in the pulsed Doppler system of FIG. 6, respectively.

FIGS. 7 show one example of a Doppler shift frequency expanded according to the pulsed Doppler system. In FIGS. 7, a signal at a time which is m-times different from the time t is sampled. In this case, m is a natural number, being 3 in this embodiment.

FIG. 7A shows measured values of echoes which are returned for intermittently transmitted pulses. With lapse of time t, the measured values are $M_{10}$, $M_{11}$, $M_{12}$, $M_{13}$, which are stored in the processing circuits 50 and 52 shown in FIG. 6. The repetition frequency is constant for each transmission, and the repetition period is represented by $\tau$. The phase differences at respective spots are given as $\phi_1$, $\phi_2$, $\phi_3$, $\phi_4$.

When paying attention to the spot $M_{13}$ now, the very short time $\Delta Xt$ shown in FIG. 3 corresponds to the time at the spot $M_{12}$ which is one spot in front of the spot $M_{13}$ as in the case of the continuous waves. The very short time $\Delta t$ is actually equivalent to the repetition period $\tau$.

As described in connection with FIG. 3, when the frequency is expanded three times, the phase difference at time $m\Delta t$ at the spot $M_{10}$, which is three spots preceding the spot $M_{13}$, should be substituted with the very short time $\Delta t$.

Specifically, for the spot $M_{13}$, the phase difference $\phi_3$ is substituted by $(\phi_1+\phi_2+\phi_3)$.

Needless to say, this substitution is effective to expansion of the Doppler shift frequency according to the invention.

In the pulsed Doppler system, since the very short time {t is however equal to the repetition period $\tau$ contrary to the continuous wave Doppler system, $\Delta t$ cannot be minimized to the limit. Therefore since $\Delta t$ is always finite, motion of the target 110 during the time $m\Delta t$ is not negligible. The foregoing processing is too slow to be applicable to a quick target.

To overcome processing delay, in the this embodiment, $\Delta t$, i.e. the phase difference $\phi_3$ of the repetition frequency $\tau$, is multiplied m-times, i.e. three times, instead of using the phase difference between the current processing spot $M_{13}$ and the spot $M_{10}$ which precedes the spot $M_{13}$ by $m\Delta t$.

FIG. 7B shows the manner in which the frequency is converted by multiplying the phase difference m-times at respective spots. The phase difference between the spots is m-times, i.e. three times, the measured value.

The phase processing circuit 52 shown in FIG. 6 includes a variable multiplier, which multiplies m-times the phase difference which has been multiplied as predetermined and temporality stored in the memory, so that a new phase will be outputted.

Figure 8:
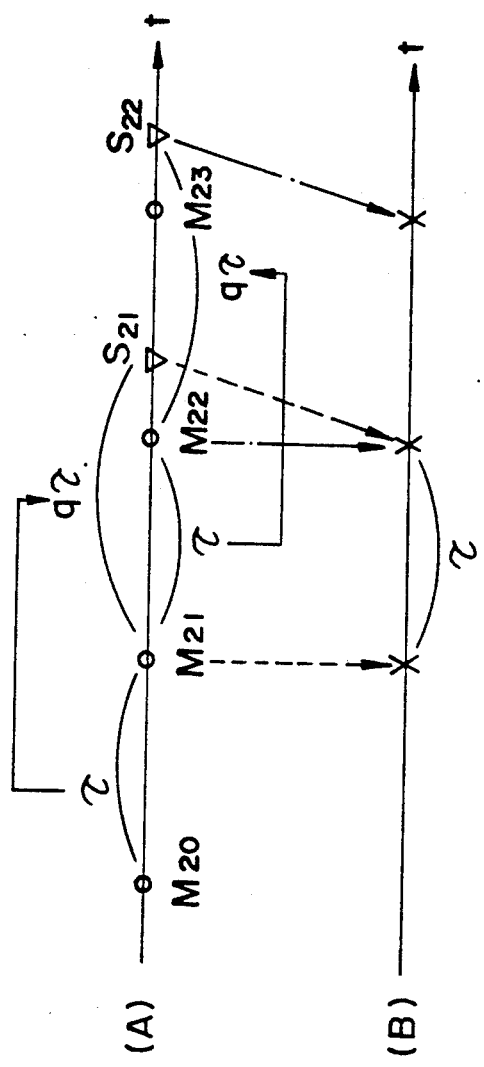

In the pulsed Doppler system, frequency conversion is carried out by setting m as follows similarly to the continuous wave Doppler system shown in FIG. 3.
m>1: Expanded
1>m>0: Compressed
m=0: Stationary
0>m: Reversed Frequency conversion is carried out only by using the measured values in the example shown in FIG. 7. It is however possible to estimate a phase difference based on the phase difference actually measured, without m-times multiplication. FIG. 8 shows an example of such processing according to this invention.

In FIGS. 8, circles designate the phases measured at respective spots M, and X's stand for estimated phases. The measured values, estimated values, and outputs allocated according to these values are shown in FIGS. 8A and 8B.

As can be seen in FIGS. 8, estimated values $S_{21}$, $S_{22}$ are shown by triangles, where $\tau$ is the repetition period and $q\tau$ is an estimated period.

The phase is estimated as described below. If variation between $M_{20}$ and $M_{21}$ is proportional to that between succeeding $M_{21}$ and $S_{21}$ with respect to time, a phase difference will be q-times the measured phase difference. The frequency will be converted as desired when the estimated phase difference is substituted in the period $\tau$ shown in FIG. 8B.

. FIGS. 8 show that the phase difference is substituted twice.

FIGS. 8 show the principle of estimation of the phase difference. It is however necessary to take aliasing into consideration in such estimation.

Since aliasing occurs at every $2\pi$, the phase change in the period t is represented by $(2\pi n+\phi)$. When n is an integer and 0, no aliasing occurs. Otherwise aliasing occurs.

The phase difference $\Delta\theta$ at $q\tau$ is expressed as:

$$\Delta\theta=q(2\pi n+\phi)=2\pi[q]n+2\pi n\Delta q+q\phi \quad (5)$$

where [ ] stands for a Gaussian symbol, and $\Delta q$ stands for a decimal part of q.

The phase difference $\Delta\phi_0$ to be measured is $$\Delta\theta_0=(2\pi n\Delta q+q\phi)mod(2\pi). \quad (6)$$

The phase $\Delta\theta e$ to be estimated based on the phase difference measured in the period $\tau$ is $$\Delta\theta e=(q\phi)mod(2\pi). \quad (7)$$

Since the estimated phase difference $\Delta\theta e$ should be equal to $\Delta\theta_0$, the following should be satisfied:

$$n\Delta q=0 \quad (8)$$

When n is not 0 (zero) due to aliasing, $\Delta q$ should be 0 (zero), i.e. q should be an integer. In a very simple case, q=1, and $\tau$ and $q\tau$ have an equal period.

For the estimation shown in FIG. 8, aliasing should be always taken into consideration. It is to be understood that the estimation is subject to some limitations.

Another embodiment of the invention will be described hereinafter, in which aliasing can be eliminated by the frequency conversion according to this invention when the limitations resulting from aliasing are cleared but the measured phase difference suffers from aliasing.

Figure 9:
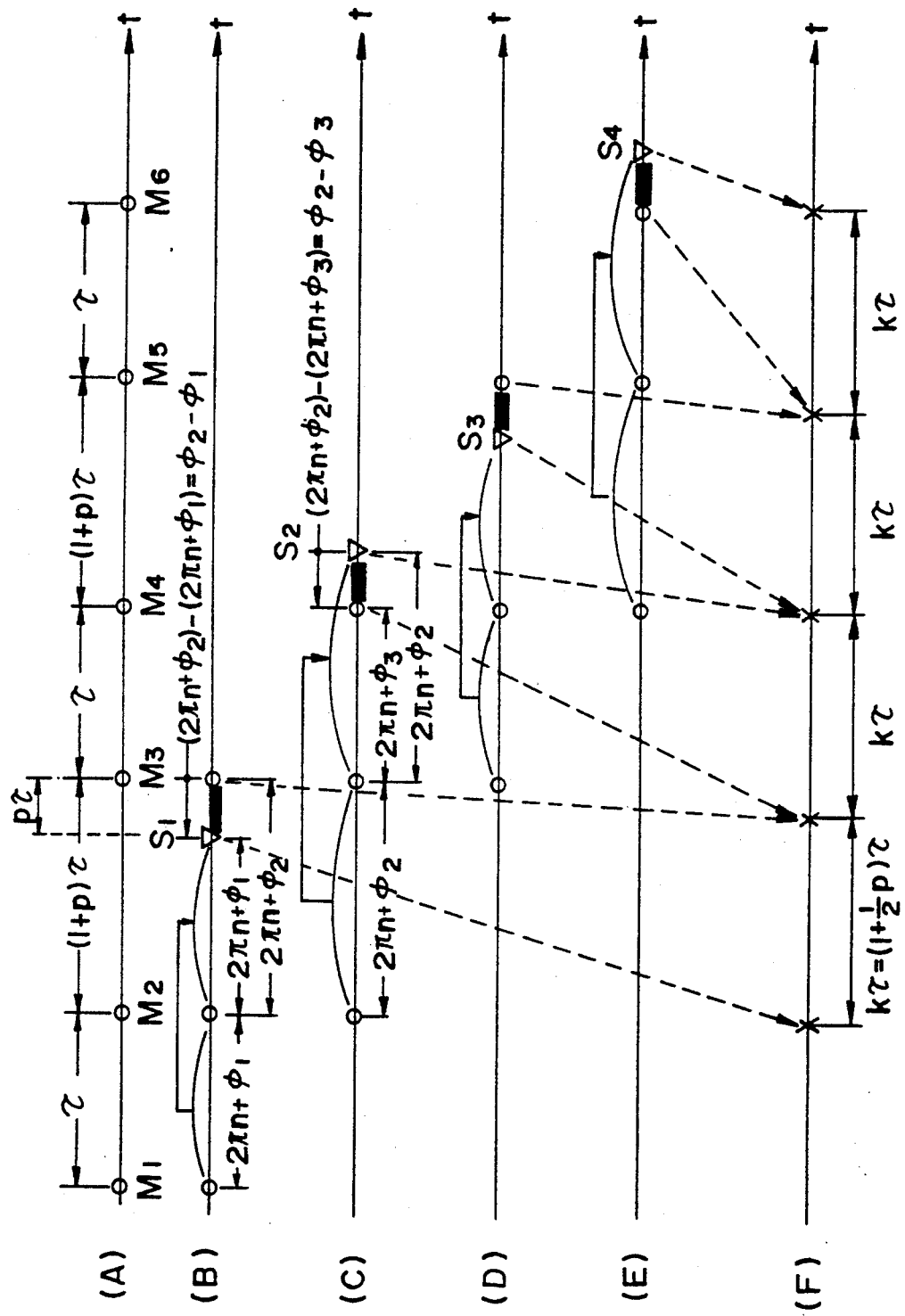

FIGS. 9 show the operation in this embodiment. FIG. 9A shows the spots $M_1$ to $M_6$ which were measured according to the pulsed Doppler system as the time t elapsed.

This embodiment features that the repetition period of the pulse is changed at each repetition frequency or at every suitable intervals. As shown in FIG. 9, the repetition period is alternately switched between $\tau$ and $(1+p)\tau$.

Aliasing occurs in the repetition period $\tau$, which naturally means that the repetition period $(1+p)\tau$ also suffers from aliasing.

According to this embodiment, a phase difference having a very short period without aliasing is determined from the measured values shown in FIG. 9A and values $S_1$, $S_2$, $S_3$, $S_4$ which will be estimated as described below. The phase difference thus obtained will be used as a new time series signal. Although the measured values suffer from aliasing, the phase difference determined as mentioned above is free from aliasing.

In the embodiment of FIGS. 9, after eliminating aliasing, the phase difference in the very short period is substituted as a phase difference in a long period so as to compress the frequency of the Doppler shift signal.

Referring to FIG. 9B, a phase difference at the spot $S_1$ is estimated based on the phase difference between the spots $M_1$ and $M_2$, which is very easy because the phase difference between these two spots is equal to the phase difference between the spot $M_2$ and the estimation spot $S_1$.

Both of these phase differences are expressed as $2\pi n + \phi_1$ in this embodiment.

It is also possible to estimate the phase difference at $S_1$ by subtracting the phase at $M_1$ from the doubled phase at $M_2$ to be described later.

Further according to the embodiment, the current repetition period $\tau$ is changed to a repetition period $(1+p)\tau$ so as to obtain a phase difference at the spot $M_3$. It is clear that the spot $M_3$ comes after the spot $S_1$ with respect to time.

In this embodiment, the time between $S_1$ and $M_3$ should be very short enough not to cause aliasing, i.e. should be set for a very high repetition frequency.

When the above requirement is satisfied, the phase difference between $S_1$ and $M_3$ is expressed by a value $(2\pi n + \phi_2)$.

When the time between $S_1$ and $M_3$ is determined to be short enough not to cause aliasing, it is important that the phase difference between $M_2$ and $M_3$ should not be $(2\pi(n+1) + \phi_2)$.

As shown in FIG. 9B, the phase difference between $S_1$ and $M_3$ is obtained as $\phi_2 - \phi_1$ from a simple algebraic equation as shown in FIG. 9, from which the term $2\pi n$ is eliminated. Therefore it is known that no aliasing occurs between $S_1$ and $M_3$.

As shown in FIG. 9C, a phase difference between $M_2$ and $M_3$ is estimated as a phase difference having the same period following the period between $S_1$ and $M_3$, and a value $S_2$ is obtained.

Measurement for the spot $M_4$ is performed at a spot which is the period $\tau$ from the spot $M_3$. Therefore the phase difference between $M_4$ and $S_2$ is determined to be $(\phi_2 - \phi_3)$ by using a simple algebraic formula as shown in FIG. 9B. FIG. 9B and FIG. 9C show what are principally the same, but differ from each other in that the estimated phase difference is before or after the actually measured phase difference with respect to time.

FIGS. 9D and 9E are essentially similar to FIGS. 9B and 9C, and will not be described in detail.

As indicated by the thick solid lines in FIG. 9, the phase difference signals without aliasing can be obtained intermittently from the actually measured values containing aliasing. In this embodiment, the frequency of the signal without aliasing is outputted in a compressed form.

As shown in FIG. 9F, a new repetition frequency train can be anticipated. As indicated by X-marks, the new pulse train has a uniform period which is a mean value of the repetition periods $\tau$ and $(1+p)\tau$, and is expressed as $k\tau = (1+\frac{1}{2}p)\tau$ as shown in FIG. 9F.

The phase differences in the periods $p\tau$ without aliasing, shown by the thick solid lines, are compressed so as to obtain a phase difference kq having an equal period, as shown in FIG. 9F.

According to this embodiment, the frequency of the Doppler shift signal can be easily compressed without considering aliasing.

Since the pulse train has the equal period of $k = (1+\frac{1}{2}p)\tau$, modulation of unnecessary low frequency components due to an unequal sampling period can be prevented.

The compression factor m of the Doppler shift frequency is expressed as:

$$m = p/k = 2p/(2+p) \qquad (9)$$

The multiplication factor p can be determined based on the compression factor m as follows:

$$p = 2m/(2-m) \qquad (10)$$

Figure 10:
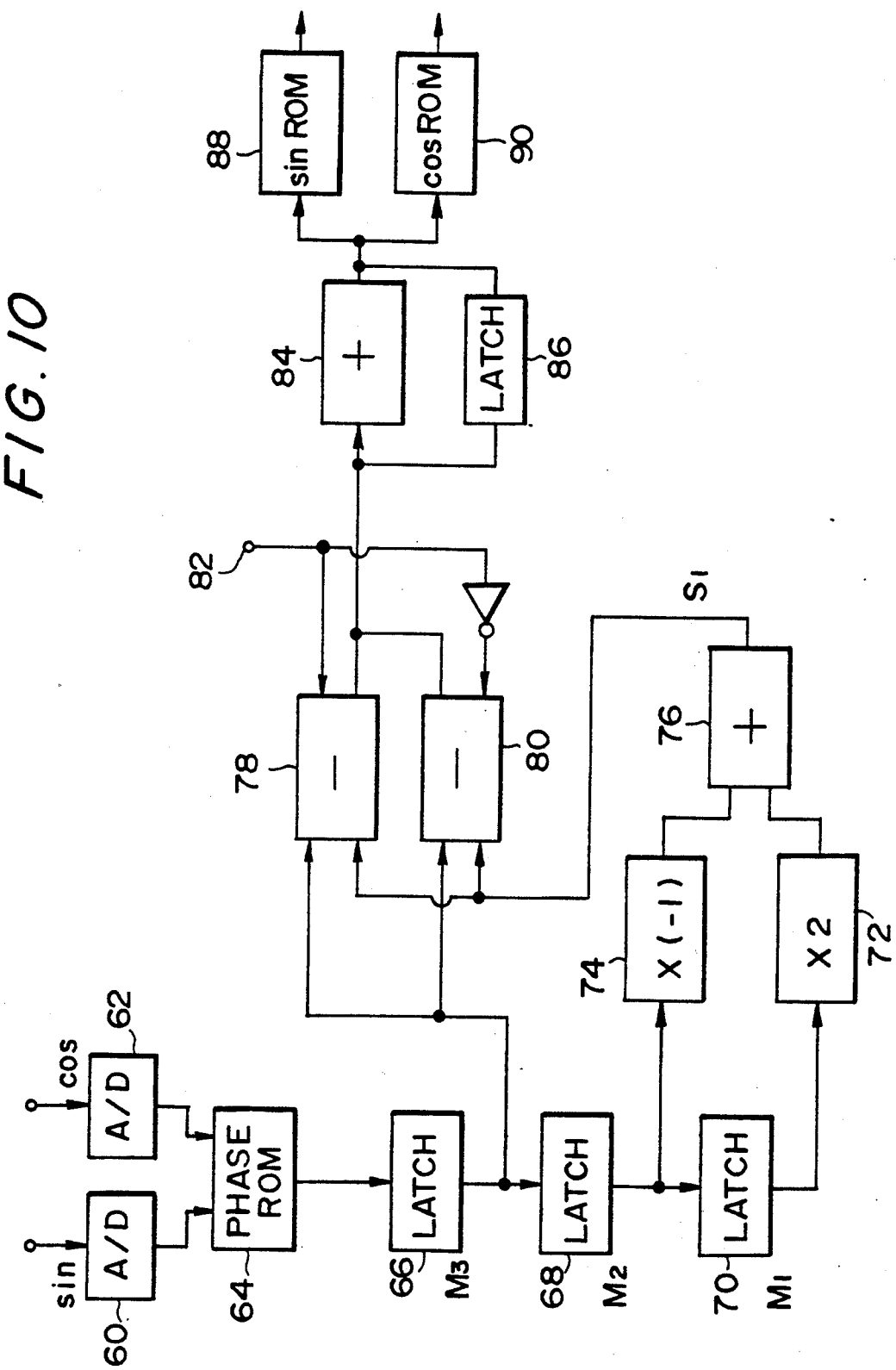
FIG. 10 is a block diagram showing in detail a phase processing circuit of FIG. 6.

According to this embodiment, conversion of the Doppler shift frequency can be performed while eliminating aliasing. The operation of the phase processing circuit 52 of FIG. 6 will be described referring to FIG. 10.

The signal obtained from the sample and hold circuit 48 of FIG. 6 actually contains a sine component and a cosine component, both of which are converted into digital signals by AD converters 60, 62, respectively.

A phase is determined based on the outputted digital signals. The phase calculation is performed not by calculating an ordinary reciprocal trigonometrical function but by reading a conversion table programmed in a phase ROM 64.

The phase ROM 64 includes a standard programmed memory table and a circuit for reading the table, and will be not be described in detail.

The phase signal read from the phase ROM 64 is outputted to three subordinate latches 66, 68, 70, being read and stored therein in succession.

The latches 66, 68, 70 composing a memory hold respectively the phases at the spots $M_3$, $M_2$, $M_1$ shown in FIGS. 9.

In the embodiment, the oldest phase at $M_1$ is multiplied twice in the multiplier 72, while the next old phase at $M_2$ is negatively multiplied once by the multiplier 74. Outputs from the multipliers 72 and 74 are supplied to an adder 76 so as to be summed.

The memory and arithmetic circuit issue an estimated value $S_1$ from the output of the adder 76.

The estimated value $S_1$ is then supplied to a pair of subtracters 78, 80, either of which subtracts the estimated value $S_1$ from the phase at $M_3$, stored in the latch 66. Selection of the subtracter 78 or 80 is determined according to a selection signal 82. For example, in case of FIG. 9B, the subtracter 78 is selected to subtract the estimated value $S_1$ from the measured value $M_3$. In case of FIG. 9C, the subtracter 80 is selected to subtract the measured value $M_4$ from the estimated value $S_2$.

Therefore the phase differences in each period $p\tau$ are determined from either the subtracter 78 or 80. The phase differences thus obtained are accumulated in succession, being sent to the adder 84. The adder 84 performs this accumulation in cooperation with the latch 86 which is in parallel with the adder 84.

The adder 84 issues an output, which is a new phase signal produced by the sinROM 88 and cosROM 90 and having a converted frequency. This output is sent to the synthesizer 54 shown in FIG. 6.

Figure 11:
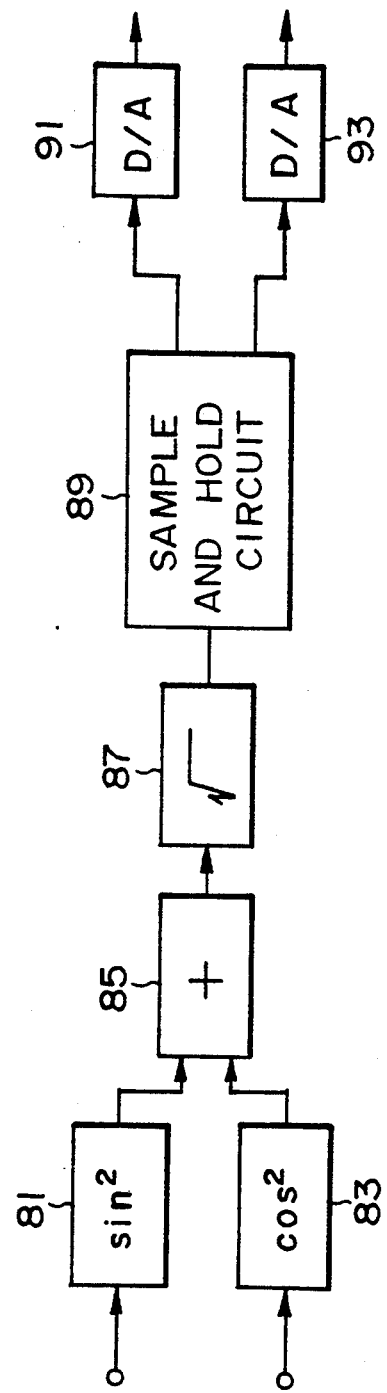
FIG. 11 is a block diagram showing in detail an envelope processing circuit of FIG. 6.

One example of the envelope processing circuit 50 of FIG. 6 is shown in FIG. 11 in detail. The sine signal and cosine signal are squared by squaring arithmetic units 81, 83, respectively. Outputs from the units 81, 83 are added in the adder 85.

An output from the adder 85 is square-rooted by a square-root extractor 87, being transmitted to DA converters 91, 93 through the sample and hold circuit 89. The DA converters 91, 93 send the received outout as envelope data to the synthesizer 54 of FIG. 6.

The synthesizer 54 synthesizes both the envelope and phase, sending them to a non-illustrated quantitative analyzer circuit in the succeeding stage.

According to the invention, the frequency of the Doppler shift signal is converted based on the phase measured by the Doppler system. The frequency can be expanded, compressed or reversed as desired so as to generate a signal without aliasing. In addition, signals from slow targets can be detected with precision.

The foregoing Doppler systems are applicable not only to devices using ultrasonics and microwaves but also to devices in a variety of technical fields.

What is claimed is:

1. A method for processing a Doppler signal, comprising: storing a Doppler shift signal; substituting the phase of said Doppler shift signal at each time t with a phase variation at time $m\Delta t$ after the current time t, as a phase change during a predetermined time $\Delta t$ at the current time t; and selecting an optional value for said m; whereby expanding, compressing or reversing of the frequency of said Doppler shift signal is performed.

2. A method for processing a pulsed Doppler signal, comprising: storing a discrete Doppler shift signal obtained by a pulsed Doppler system; producing a new Doppler signal train by multiplying m-times the phase component of said Doppler shift signal; and setting said m to a predetermined value; whereby expanding, compressing or reversing of the frequency of said pulsed Doppler signal is performed.

3. A method for processing a pulsed Doppler signal, comprising: multiplying q-times the phase component of said Doppler shift signals; allocating the multiplied phase component as an estimated phase shift component at an actually measured period; and setting said q to a predetermined value; whereby expanding, compressing or reversing the frequency of said pulsed Doppler signal is performed.

4. A method for processing a pulsed Doppler signal, comprising: changing the repetition period of a pulse sending signal; estimating a phase in a period succeeding and corresponding to an actually measured period based on a phase difference of actually measured pulsed Doppler shift signals; determining a difference between the estimated phase and a phase actually measured in a period different from the period for the estimated phase; fetching a difference of the intermittently obtained phases having a short period as a difference of the phases having a long equal period; and compressing the frequency of said Doppler shift signal without aliasing.

5. A method for processing a Doppler shift signal, comprising:
separating the Doppler shift signal into envelope data and a first phase data;
converting said first phase data into a second phase data so as to convert a Doppler shift frequency to a different frequency; and
synthesizing said second phase data and said envelope data so as to obtain a new Doppler shift signal.

6. A method according to claim 5, wherein said envelope data are maintained as they are int he converting step.

7. A method according to claim 6, wherein a variation of said first phase data is multiplied m-times.

8. A method according to claim 7, wherein m is larger than 1 (1<m).

9. A method according to claim 7, wherein m is larger than 0 and is smaller than 1 (0<m<1).

10. A method according to claim 7, wherein m is equal to 0 (m=0).

11. A method according to claim 7, wherein m is smaller than 0 (m<0).

12. A method according to claim 7, wherein said new Doppler shift signal is input into a filter circuit.

* * * * *